United States Patent
Kim et al.

(10) Patent No.: US 7,011,562 B2
(45) Date of Patent: Mar. 14, 2006

(54) ORGANIC ELECTROLUMINESCENCE DISPLAY PANEL AND METHOD FOR SEALING THE SAME

(75) Inventors: Chang Nam Kim, Seoul (KR); Jong Geon Yoon, Kyonggi-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/627,816

(22) Filed: Jul. 28, 2003

(65) Prior Publication Data

US 2004/0036411 A1    Feb. 26, 2004

Related U.S. Application Data

(62) Division of application No. 09/703,964, filed on Feb. 16, 2001, now Pat. No. 6,624,572.

(30) Foreign Application Priority Data

Feb. 17, 2000 (KR) ................................. 2000-7430
Apr. 24, 2000 (KR) ................................. 2000-21700

(51) Int. Cl.
    *H01J 9/24* (2006.01)
(52) U.S. Cl. .......................................... 445/25; 445/44

(58) Field of Classification Search ................ 445/24, 445/25, 44; 313/512, 506
See application file for complete search history.

(56) References Cited

U.S. PATENT DOCUMENTS

| 4,599,538 | A  | * | 7/1986  | Hidler et al. ................ 313/512 |
| 6,049,167 | A  | * | 4/2000  | Onitsuka et al. ............ 313/512 |
| 6,081,071 | A  | * | 6/2000  | Rogers ....................... 313/512 |
| 6,111,357 | A  |   | 8/2000  | Fleming et al. |
| 6,137,220 | A  |   | 10/2000 | Nagayama et al. |
| 6,210,815 | B1 | * | 4/2001  | Ooishi ........................ 428/690 |
| 6,333,603 | B1 | * | 12/2001 | Juang et al. ............. 315/169.3 |
| 6,563,263 | B1 | * | 5/2003  | Kawaguchi et al. ........ 313/509 |
| 6,635,989 | B1 | * | 10/2003 | Nilsson et al. .............. 313/512 |

* cited by examiner

*Primary Examiner*—Ashok Patel
(74) *Attorney, Agent, or Firm*—Fleshner & Kim LLP

(57) ABSTRACT

An organic EL display panel has a multi-layered structure in which a first electrode and a second electrode are formed on a transparent panel and an organic EL layer is formed between the first and second electrodes. A method for sealing the organic EL display panel includes the steps of forming a buffer layer of an inorganic matter such as silicon oxide and silicon nitride on the transparent panel, and locating a shield cover on the buffer layer. Thus, adhesive strength between the panel and an adhesive is enhanced to prevent external humidity and oxygen from being permeated into the panel, thereby increasing life span of the display.

9 Claims, 5 Drawing Sheets

ORGANIC ELECTROLUMINESCENCE DISPLAY PANEL AND METHOD FOR SEALING THE SAME

REFERENCE TO RELATED APPLICATIONS

This application is a Divisional Application of U.S. Pat. No. 6,624,572 issued on Sep. 23, 2003. The disclosures of the previous application are incorporated by reference herein.

BACKGROUND OF THE INVENTION

1. Field of the Invention

The present invention relates to an organic electroluminescence (EL) display panel, and more particularly to an organic EL display panel and a method for sealing the same.

2. Description of the Related Art

Recently, with a large sized tendency of a display device, request for a flat display occupied in a small space is increasing. As an example of the flat display, an EL display is receiving much attention.

The EL display is divided into an inorganic EL display and an organic EL display in accordance with its materials. Of them, the organic EL display emits light while electrons injected into an organic EL layer are combined with a hole and erased. The organic EL layer is formed between a cathode and an anode.

The organic EL display has an advantage in that it is driven at a lower voltage (for example, about 10V or less) than a voltage of a plasma display panel (PDP) or an inorganic EL display. Also, since the organic EL display has further advantages such as a wide viewing angle, high speed reactivity, and high contrast, it is used as a pixel of a graphic display, a television video display, and a surface light source. Moreover, since the organic EL display is thin and weighs light, and its color sensitivity is good, it is suitable for a next generation flat display.

However, the most serious problem in commercially using the organic EL display is that its life span is short.

The life span of the display is determined by various factors such as impurities within organic matters, interface between the organic matters and electrodes, a low crystallization temperature (Tg) of the organic matters, and oxidation of the display due to oxygen and humidity. Problems related to such factors can be solved by refinement of the organic matters, development of a material having a high crystallization temperature, and induction of an organic metal to the interface between the electrodes and the organic matters. However, it is difficult to solve the problem related to oxidation of the display due to oxygen and humidity.

Oxygen and humidity that oxidize the display may exist in the display or may externally be permeated during the fabricating process steps. Oxygen and humidity are permeated into a pinhole of the display and oxidize an organic film and metal, thereby failing to perform a light emitting function of the display.

In the related art, to solve this problem, the display is covered with a shield glass to externally cut off humidity and oxygen.

In other words, as shown in FIGS. 1a and 1b, an organic EL display provided with a glass panel 1, a first electrode 2, an organic EL layer 3, and a second electrode 4 is covered with a shied glass 5 to cut off humidity and oxygen.

The shield glass 5 is attached to a corner portion of the panel by an adhesive 6.

However, since adhesive strength of the adhesive 6 is not good for a glass panel, the adhesive 6 is detached from the panel after a constant time elapses.

If the adhesive 6 is detached from the panel, a gap occurs between the panel and the adhesive so that humidity or oxygen is permeated into the display. For this reason, a problem arises in that life span of the display is shortened.

SUMMARY OF THE INVENTION

To solve the above problems, an object of the present invention is to provide an organic EL display panel and a method for sealing the same, in which life span of the display can be improved by adhesive strength between a panel and an adhesive.

To achieve the above object, in an organic EL display panel having a multi-layered structure in which a first electrode and a second electrode are formed on a transparent panel and at least one organic EL layer is formed between them, the organic EL display panel according to the present invention includes a buffer layer formed on the transparent panel and a shield cover located on the buffer layer.

In another aspect, in a method for sealing an organic EL display panel having a multi-layered structure in which a first electrode and a second electrode are formed on a transparent panel and an organic EL layer is formed between the first and second electrodes, the method for sealing an organic EL display panel according to the present invention includes the steps of forming a buffer layer on the transparent panel, and locating a shield cover on the buffer layer.

The buffer layer is formed on an entire surface of the panel other than a tap bonding region and a pixel region of the first and second electrodes, or only on the panel of a region where the shield cover is located on the transparent panel, or both on the panel of a region where the shield cover is located and on the electrode of a region where the shield cover is located.

Also, the buffer layer of the region where the shield cover is located has an uneven shape or a dot shape. The dot shaped buffer layer is formed of any one of a round shape, a triangle shape, a quadrangle shape, a polygonal shape, and so on.

The buffer layer of the region where the shield cover is located and the buffer layer of a region other than the region where the shied cover is located have the same material as each other or a different material from each other. In other words, the buffer layer of the region where the shield cover is located includes a material of either silicon oxide or silicon nitride, while the buffer layer of the region other than the region where the shield cover is located includes a material of silicon oxide, silicon nitride, polyimide, or polyacryl.

In the present invention, an inorganic material such as silicon oxide and silicon nitride is formed on the panel of the region where the shield cover is located, so that adhesive strength between the panel and the adhesive is enhanced to prevent external humidity and oxygen from being permeated into the panel, thereby increasing life span of the display.

It is to be understood that both the foregoing general description and the following detailed description are exemplary and explanatory and are intended to provide further explanation of the invention as claimed.

BRIEF DESCRIPTION OF THE DRAWINGS

Other objects, characteristic features and advantages of the present invention will now become apparent with a detailed description of an embodiment made with reference to the accompanying drawings, in which:

FIG. 3 shows various uneven shapes of a buffer layer of FIG. 2a;

DETAILED DESCRIPTION OF PREFERRED EMBODIMENTS

The following is a detailed description of a preferred embodiment of an organic EL display panel and a method for sealing the same according to the present invention made with reference to the accompanying drawings.

Figure 1A:
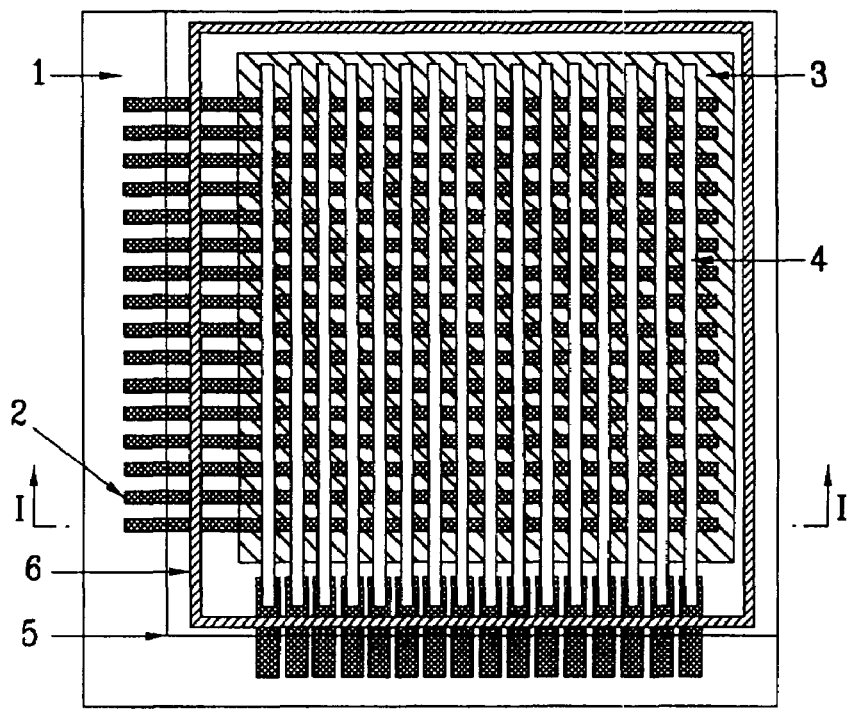
FIGS. 1a and 1b are a plane view and a sectional view showing a related art method for sealing an organic EL display panel.
Figure 1B:
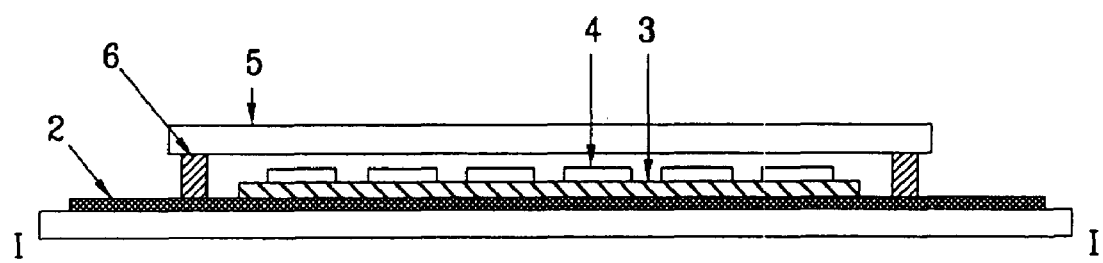
Figure 2A:
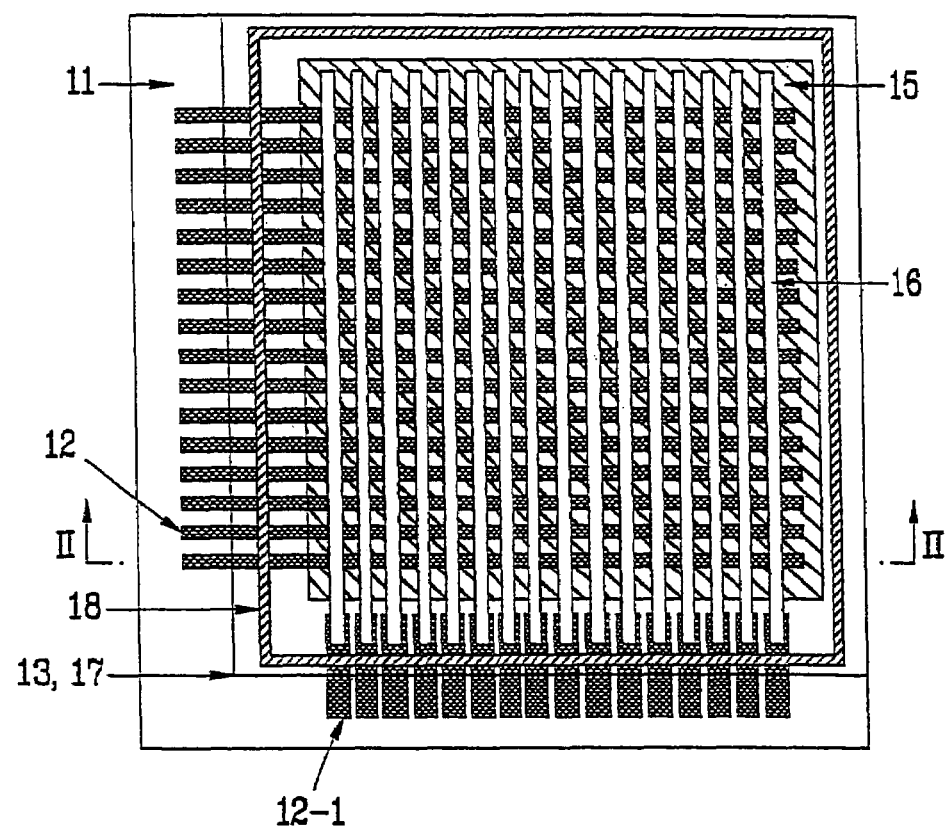
FIGS. 2a and 2b are a plane view and a sectional view showing a method for sealing an organic EL display panel according to the first embodiment of the present invention.
Figure 2B:
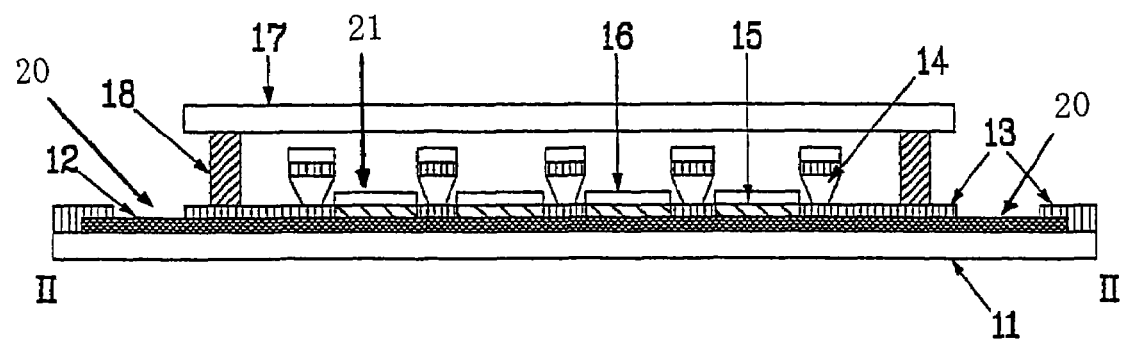

FIGS. 2a and 2b are a plane view and a sectional view showing a method for sealing an organic EL display panel according to the first embodiment of the present invention.

As shown in FIGS. 2a and 2b, to form an organic EL display, a transparent conductive film such as Indium Tin Oxide (ITO) is formed on a transparent insulating panel 11 such as glass. The transparent conductive film is patterned by photolithography process to form first electrodes 12 having a plurality of stripes and contact pads 12-1 for contact with second electrodes which will be formed later.

A buffer layer 13 is formed on an entire surface of the panel other than a tap bonding region 20 and a pixel 21 of the first electrode 12 and the contact pads 12-1.

The buffer layer 13 acts differently depending on its formation position. In other words, a function of the buffer layer formed in a corner portion of the panel 11 is different from that of the buffer layer formed around the pixel region.

The buffer layer formed in a corner portion of the panel 11 acts to enhance adhesive strength of an adhesive when a shield cover is attached to the panel. The buffer layer formed around the pixel region acts to perform electrical insulation between the first electrode and the second electrode and between the second electrodes.

Figure 3:
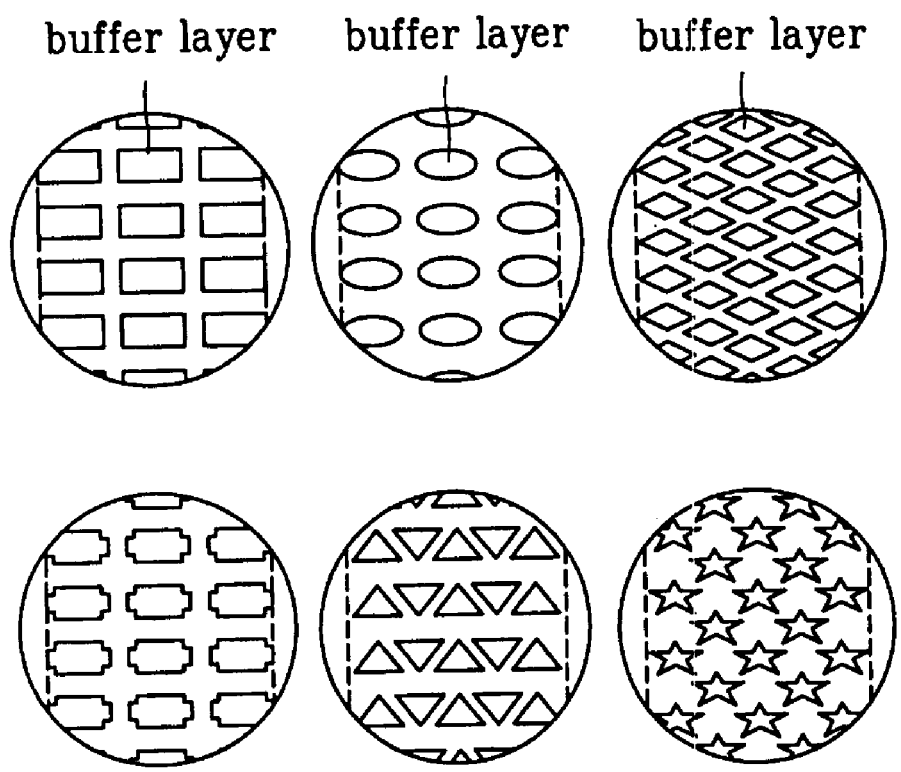

A region of the buffer layer formed in a corner portion of the panel 11 (i.e., a region where the shield cover is located) may have an uneven shape or a dot shape, as shown in FIG. 3, to enhance adhesive strength of the adhesive.

That is, the dot shaped buffer layer may be formed of any one of various shapes such as a round shape, a triangle shape, a quadrangle shape, and a polygonal shape.

The buffer layer formed around the pixel region may have a stripe shape in a direction orthogonal to the first electrode 12. As described above, since the buffer layer 13 acts differently depending on its position, one material or different materials may be used as the buffer layer 13.

In other words, the material of the buffer layer formed in a corner portion of the panel (buffer layer of a region where the shield cover is located) is an inorganic matter such as silicon oxide and silicon nitride. The material of the buffer layer formed around the pixel region (buffer layer of a region other than the region where the shield cover is located) may be either an inorganic matter such as silicon oxide and silicon nitride or an organic matter such as polyimide, and polyacryl.

At this time, the buffer layer has a thickness of about 0.1~5 $\mu$m.

Next, for electrical insulation between second electrode stripes which will be formed later, electrical insulation barrier stripes 14 are formed on the buffer layer 13.

Subsequently, organic EL layers 15 are formed on the electrical insulation barrier stripes 14.

The organic EL layers 15 are formed to be wider than an entire light-emitting region (an entire region where the first and second electrodes cross orthogonally). However, the organic EL layers 15 should be formed inwardly rather than end portions of the contact pads 12-1.

A conductive material such as Al, Mg:Ag, and Al:Li is formed to form second electrodes 16. Thus, the fabrication of the organic EL display is completed.

Here, the second electrodes 16 are formed to be wider than the light-emitting region and to be connected with the contact pads 12-1.

Subsequently, the organic EL display is covered with a shield cover 17 to cut off humidity and oxygen. The shield cover 17 is attached to the buffer layer 13, which is formed in a corner portion of the panel, by an adhesive 18. A UV hardening high molecular substance is used as the adhesive 18. In addition, other adhesives such as a thermal hardening adhesive or an inorganic adhesive may be used.

After the buffer layer is formed as described above, if the shield cover is attached to the buffer layer by the adhesive, adhesive strength of the adhesive is enhanced, thereby failing to permeate external humidity or oxygen into the organic EL display.

Figure 4A:
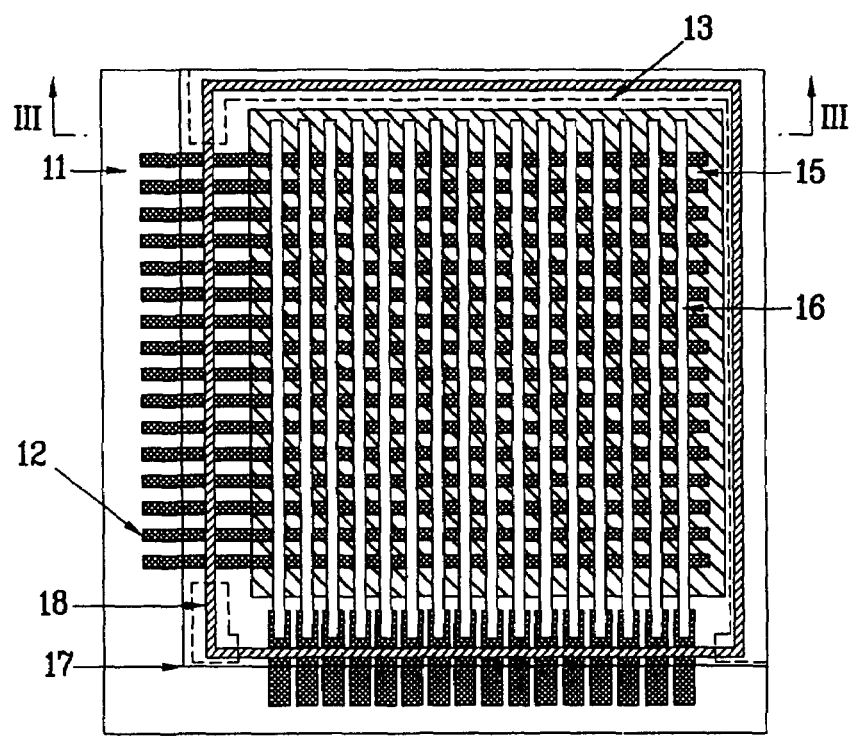
FIGS. 4a and 4b are a plane view and a sectional view showing a method for sealing an organic EL display panel according to the second embodiment of the present invention.
Figure 4B:
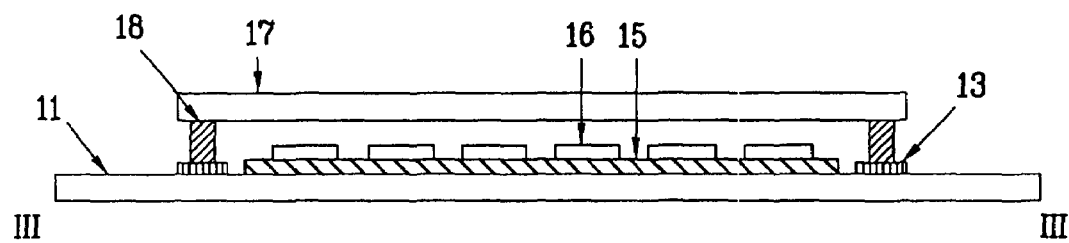

FIGS. 4a and 4b are a plane view and a sectional view showing a method for sealing an organic EL display panel according to the second embodiment of the present invention.

In the second embodiment of the present invention, a buffer layer is only formed on a panel of a region where a shield cover is located.

Generally, since a sealing adhesive does not have good adhesive strength with the panel, the buffer layer is formed on only the panel of the region where the shield cover is located.

Also, the buffer layer may have an uneven shape or a dot shape to enhance adhesive strength of the adhesive in the same manner as the first embodiment.

In the second embodiment, since the buffer layer is only formed on the panel of the region where the shield cover is located, the process is simplified. However, in this case, either a display structure which does not require an electrical insulation barrier or a display structure which enables electrical insulation between second electrodes by an electrical insulation barrier only without a buffer layer is required.

Figure 5A:
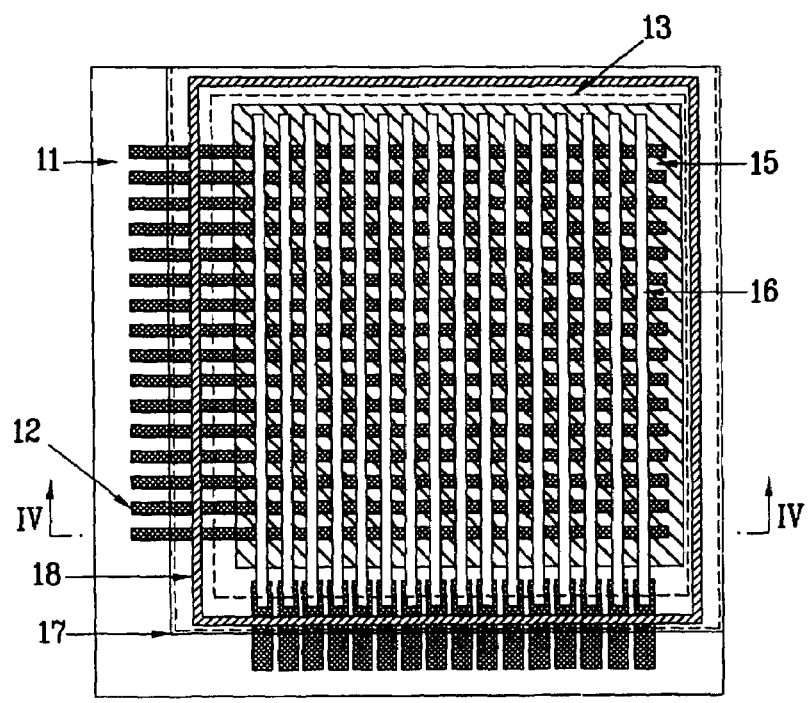
FIGS. 5a and 5b are a plane view and a sectional view showing a method for sealing an organic EL display panel according to the third embodiment of the present invention.
Figure 5B:
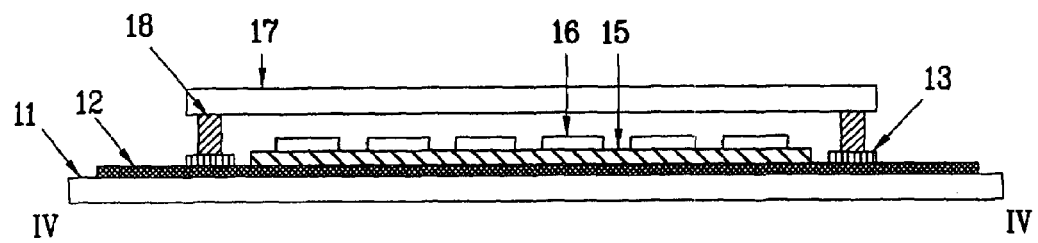

FIGS. 5a and 5b are a plane view and a sectional view showing a method for sealing an organic EL display panel according to the third embodiment of the present invention.

In the third embodiment of the present invention, a buffer layer is formed on both a panel of a region where a shield cover is located and an electrode of a region which the shield cover is located.

Also, the buffer layer may have an uneven shape or a dot shape to enhance adhesive strength of the adhesive in the same manner as the first embodiment.

In the third embodiment, the process is also simplified. However, either a display structure which does not require an electrical insulation barrier or a display structure which enables electrical insulation between second electrodes by an electrical insulation barrier only without a buffer layer is required.

As aforementioned, the organic EL display panel and the method for sealing the same according to the present invention have the following advantages.

The inorganic matter such as silicon oxide and silicon nitride is formed on the panel of the region where the shield cover is located, so that adhesive strength between the panel and the adhesive is enhanced to prevent external humidity and oxygen from being permeated into the panel, thereby increasing life span of the display.

The above description will enable one skilled in the art to modify and revise the invention within the spirit not degrading the technical concept of the present invention. However, the technical scope of the present invention is not limited to the above description of the embodiment but shall be determined by the claims.

What is claimed is:

1. A method for sealing an organic EL display panel having a multi-layered structure in which a first electrode and a second electrode are formed on a transparent panel and at least one organic EL layer is formed between them, the method for sealing an organic EL display panel comprising the steps of:

forming a buffer layer on the transparent panel; and locating a shield cover on the buffer layer;

wherein the buffer layer is formed on an entire surface of the transparent panel other than a tap bonding region and a pixel region of the first and second electrodes.

2. A method for sealing an organic EL display panel having a multi-layered structure, a first electrode and a second electrode formed on a transparent panel and an at least one organic EL layer formed between them, comprising the steps of:

forming a buffer layer on an entire surface of the transparent panel other than a tap bonding region and a pixel region of the first and second electrodes;

forming an organic EL layer on the pixel region of the first and second electrodes;

forming an adhesive layer on the buffer layer; and forming a shield cover on the adhesive layer for protecting the organic EL layer.

3. The method of claim 1 or 2, wherein the buffer layer is formed only on the panel in a region where the shield cover is located.

4. The method of claim 1 or 2, wherein the buffer layer is formed both on the panel in a region where the shield cover is located and on the first electrode in a region where the shield cover is located.

5. The method of claim 1 or 2, wherein the buffer layer in the region where the shield cover is located has an uneven shape or a dot shape.

6. The method of claim 5, wherein the dot shaped buffer layer is formed of any one of a round shape, a triangle shape, a quadrangle shape, and a polygonal shape.

7. The method of claim 1 or 2, wherein the buffer layer in the region where the shield cover is located and the buffer layer in a region other than the region where the shield cover is located have the same material as each other or a different material from each other.

8. The method of claim 7, wherein the material of the buffer layer in the region where the shield cover is located is either silicon oxide or silicon nitride, while the material of the buffer layer in the region other than the region where the shield cover is located is any one of silicon oxide, silicon nitride, polyimide, and polyacryl.

9. The method of claim 1 or 2, wherein the buffer layer has a thickness of about 0.1~5 $\mu$m.

* * * * *

UNITED STATES PATENT AND TRADEMARK OFFICE
CERTIFICATE OF CORRECTION

| | | |
|---|---|---|
| PATENT NO. | : 7,011,562 B2 | Page 1 of 1 |
| APPLICATION NO. | : 10/627816 | |
| DATED | : March 14, 2006 | |
| INVENTOR(S) | : Chang Nam Kim and Jong Geon Yoon | |

It is certified that error appears in the above-identified patent and that said Letters Patent is hereby corrected as shown below:

Title Page, Related U.S. Application Data

Item (62) should read -- Divisional of Application No. 09/783,964, filed on Feb. 16, 2001, now Patent No. 6,624,572 --

Signed and Sealed this

Twenty-fourth Day of April, 2007

JON W. DUDAS
*Director of the United States Patent and Trademark Office*